(12) United States Patent
Sankaranarayanan et al.

(10) Patent No.: US 10,289,339 B2
(45) Date of Patent: May 14, 2019

(54) SYSTEM AND METHOD FOR STORING MODIFIED DATA TO AN NVDIMM DURING A SAVE OPERATION

(71) Applicant: DELL PRODUCTS, LP, Round Rock, TX (US)

(72) Inventors: Vadhiraj Sankaranarayanan, Austin, TX (US); John E. Jenne, Austin, TX (US); Quy N. Hoang, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/445,179

(22) Filed: Feb. 28, 2017

(65) Prior Publication Data

US 2018/0246647 A1    Aug. 30, 2018

(51) Int. Cl.
*G06F 3/06* (2006.01)

(52) U.S. Cl.
CPC ............ *G06F 3/065* (2013.01); *G06F 3/0619* (2013.01); *G06F 3/0685* (2013.01); *G06F 3/0656* (2013.01); *G06F 3/0688* (2013.01)

(58) Field of Classification Search
CPC ...... G06F 3/065; G06F 3/0656; G06F 3/0619; G06F 3/0685; G06F 3/0688
USPC ................................................. 711/103, 104
See application file for complete search history.

(56) References Cited

U.S. PATENT DOCUMENTS

| | | | |
|---|---|---|---|
| 6,819,577 B1 | 11/2004 | Wiktor et al. | |
| 7,368,959 B1 | 5/2008 | Xu et al. | |
| 8,489,775 B2 | 7/2013 | Berke et al. | |
| 2012/0023262 A1 | 1/2012 | Berke et al. | |
| 2016/0118121 A1 | 4/2016 | Kelly et al. | |
| 2016/0342487 A1* | 11/2016 | Ware ........................ | G11C 7/20 |
| 2017/0010817 A1* | 1/2017 | Lim ....................... | G06F 3/0604 |
| 2017/0109058 A1* | 4/2017 | Shallal .................. | G06F 3/0611 |

OTHER PUBLICATIONS

U.S. Appl. No. 15/331,064, filed Oct. 21, 2016.
U.S. Appl. No. 15/276,240, filed Sep. 21, 2016.
Xed: Exposing On-Die Error Detection Information for Strong Memory Reliability, Prashant J. Nair et al., ISCA-43, Jun. 20, 2016, pp. 1-13.

\* cited by examiner

*Primary Examiner* — Shane D Woolwine
(74) *Attorney, Agent, or Firm* — Larson Newman, LLP (57) ABSTRACT

A DIMM includes a DRAM device and a non-volatile memory device. The DIMM is configured to determine that first data stored on the DRAM device is modified data and that second data stored on the DRAM device is unmodified data, and perform a save data operation to transfer the data from the DRAM device to the non-volatile memory device, wherein the save data operation comprises transferring the first data and not transferring the second data.

14 Claims, 3 Drawing Sheets

SYSTEM AND METHOD FOR STORING MODIFIED DATA TO AN NVDIMM DURING A SAVE OPERATION

FIELD OF THE DISCLOSURE

This disclosure generally relates to information handling systems, and more particularly relates to storing modified data to a non-volatile memory device on an NVDIMM during a save data operation.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Memory for an information handling system often includes one or more Dual In-Line Memory Modules (DIMMs). The DIMMs are typically configured in accordance with a particular Double Data Rate (DDR) standard, such as a fourth generation standard (DDR4). A non-volatile DIMM (NVDIMM) of a particular type (the NVDIMM-N) may operate as a normal DIMM, but also includes sufficient non-volatile (flash) memory to store the contents of the DIMM in the event of a power failure. As such, an information handling system that supports NVDIMM-N operation may include a separate power source dedicated to operating the NVDIMM-N in a save data operation.

SUMMARY

A DIMM may include a DRAM device and a non-volatile memory device. The DIMM may be configured to determine that first data stored on the DRAM device is modified data and that second data stored on the DRAM device is unmodified data, and perform a save data operation to transfer the data from the DRAM device to the non-volatile memory device. The save data operation may include transferring the first data and not transferring the second data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
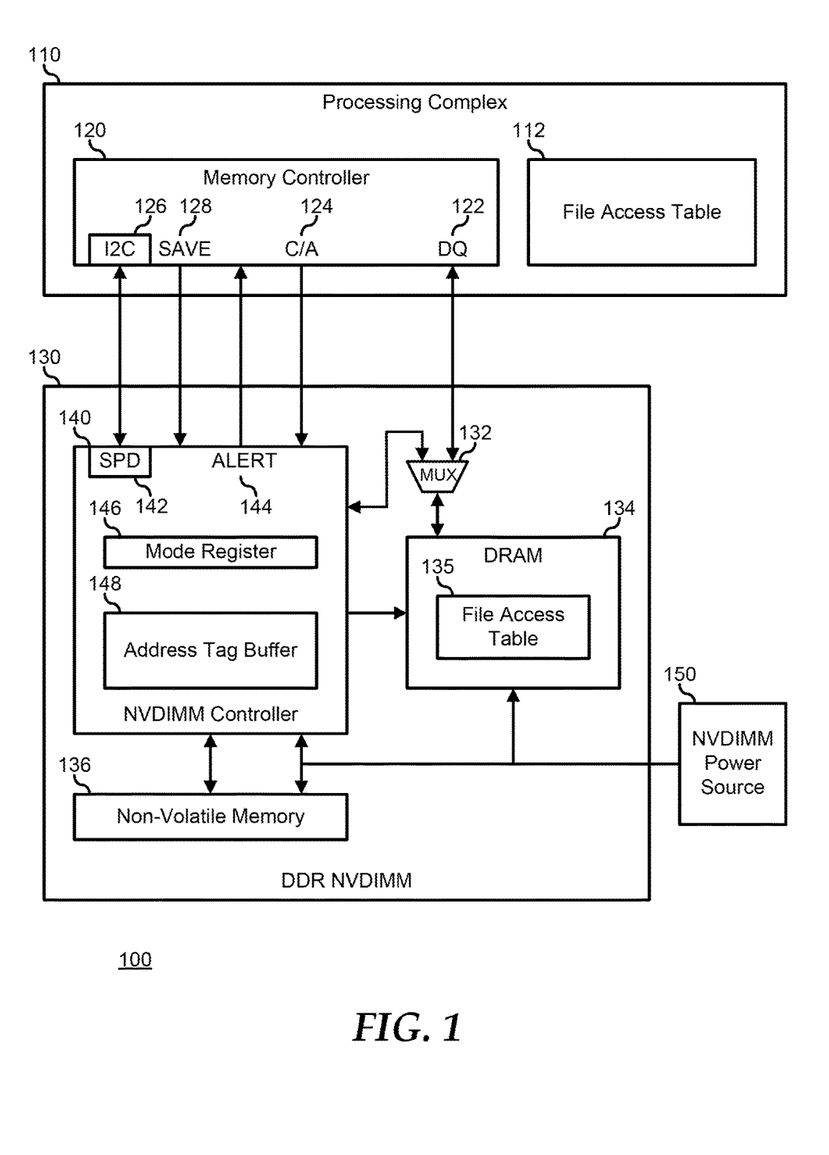
FIG. 1 is a block diagram illustrating an information handling system that includes an NVDIMM according to an embodiment of the present disclosure.

FIG. 1 illustrates an embodiment of an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system can 100 also include one or more buses operable to transmit information between the various hardware components.

A problem may arise when information handling system 100 employs JEDEC Standard NVDIMM-N type NVDIMMs. As the number of memory devices supported on an information handling system increases, and as the use of NVDIMM-Ns becomes more popular, the number of NVDIMM-Ns that need to be powered by the separate power source during a save data operation will place increasing burdens on that power source.

Information handling system 100 includes a processing complex 110, a Dual Data Rate (DDR) Non-Volatile Dual In-Line Memory Module (NVDIMM) 130, and an NVDIMM power source 150. NVDIMM 130 represents an NVDIMM-N type NVDIMM that includes memory mapped Dynamic Random Access Memory (DRAM) devices of the NVDIMM that provide the for data storage under normal operating conditions for information handling system 100. Under certain operating conditions, such as in the event of a loss of system power, the data stored in the DRAM devices is saved to non-volatile memory devices of NVDIMM 130. Later, such as when the system power is restored, the data stored in the non-volatile memory devices is restored to the DRAM devices.

Typically, a save data operation is initiated when a memory controller of processing complex 110 asserts a particular save data signal to NVDIMM 130. The memory controller can assert the save data signal in response to, for example, an AC power loss scenario. Here, when the memory controller is informed of the AC power loss scenario, the memory controller can store various data, such as data from processor caches and data buffers, to the DRAM devices of NVDIMM 130, place the DRAM devices into a self-refresh mode, and then assert the save data signal to the NVDIMM. At this time, the components of NVDIMM 130 are supplied with power from NVDIMM power source 150 for the duration of the save data operation. In response to the assertion of the save data signal, an NVDIMM controller reads the data from the DRAM devices, stores the data to one or more non-volatile memory devices of the NVDIMM, and turns the NVDIMM off until a subsequent power cycle event turns the NVDIMM back on. When NVDIMM 130 is turned off in response to the save data operation, the memory controller cannot determine from the NVDIMM whether or not the save data operations was successful, that is, whether or not the data from the DRAM devices was successfully saved to the non-volatile memory devices. Instead, the system BIOS must wait for the subsequent power on sequence on information handling system 100, and the system BIOS instructs the memory controller to read status registers of the NVDIMM controller via an Inter-Integrated Circuit (I2C) interface to determine if the save data operation was successful. In a particular embodiment, the save data operation represents a JEDEC Standard SAVE operation, and the save data signal represents a JEDEC Standard SAVE_n signal, such as may be provided by a memory controller to a NVDIMM.

NVDIMM power source 150 is configured to provide power to one or more NVDIMMs similar to NVDIMM 130 for the projected duration of the save data operation. However, as the number of DIMM slots on information handling system 100 increases, the use of NVDIMM-N technology increases, or as the density of NVDIMM-N devices increases, the amount and duration of the power provided by NVDIMM power source 150 must similarly increase. As such, the amount of real estate on a printed circuit board that instantiates information handling system 100 that must be dedicated to NVDIMM power source 150 increases, as does the cost of the components to implement the NVDIMM-N technology.

In a particular embodiment, information handling system 100 operates to monitor data usage on NVDIMM 130 to determine if one or more rows of data has been modified since a previous save data operation on the information handling system has occurred. Then, when a next save data operation is initiated, NVDIMM 130 operates to read only the rows with modified data and to store that data to the non-volatile memory device. Here, rows with unmodified data are already stored to the non-volatile memory device, and so it is not necessary to read and to store the unmodified data to the non-volatile memory device. In this way, the power demand on NVDIMM power source 150 can be reduced because during each save data operation, some smaller portion of the data stored on NVDIMM 130 is stored to the non-volatile memory device. Note that in cases of repeated power events, NVDIMM 130 may have no modified data since a prior save data operation. Here, there would be no need to save any data on NVDIMM 130, thus resulting in a maximum of battery discharge savings.

Processing complex 110 includes a hardware memory controller 120 and a file access table 114. Processing complex 110 represents the hardware, software, firmware, and other elements associated with the performance of the processing tasks associated with information handling system. As such, processing complex 110 may be understood to include one or more data processors or processing cores, one or more input/output (I/O) devices such as processor, memory, or I/O controller hub, system memory including random access memory (RAM) and system read-only memory (ROM), mass data storage devices, video processors, network interface devices, or other devices typical to an information handling system, as needed or desired. Memory controller 120 represents a device of processing complex 110 that manages the flow of data going to and from NVDIMM 130. As such, memory controller 120 is connected to NVDIMM 130 via a double-data rate (DDR) channel. The DDR channel includes a data bus (DQ), a control/address bus (C/A) 124, an Inter-Integrated Circuit (I2C) interface 126, a save data signal output 128, and an input for receiving an alert signal from NVDIMM 130. File access table 114 is utilized by information handling system 100 in a particular embodiment for performing save data operations on modified data, as described further, below.

NVDIMM 130 includes a memory channel multiplexor 132, a DDR DRAM device 134, non-volatile memory devices 126, and an NVDIMM controller 130. DRAM device 134 include a file access table 135 similar to file access table 112. NVDIMM controller 140 includes a serial presence detect (SPD) logic 142 connected to I2C interface 126, an input for receiving save data signal output 128, an alert output 144 to memory controller 120, inputs for receiving C/A 124, one or more mode registers 146, and an address tag buffer 148. NVDIMM controller 140 is connected to C/A 124 to receive command and address information from memory controller 120 for DRAM device 134. NVDIMM controller 140 is also connected to DRAM device 134 to provide the command and address information to the DRAM device. DRAM device 134 is connected to multiplexor 132 to selectively connect to data bus DQ 122 to transfer data between the DRAM device and memory controller 120, and to NVDIMM controller 140 to transfer data between the DRAM device and non-volatile memory device 136. Note that the skilled artisan will recognize that multiplexor 132 and DRAM device 134 are typically representative of multiple multiplexors and DRAM devices in the typical NVDIMM.

In normal operation, memory controller 130 issues memory transactions for memory locations associated with DRAM device 134 by providing command and address information on C/A 124 to NVDIMM controller 140. For example, a memory read to a memory location associated with DRAM device 134 will start with memory controller 120 presenting data read command and address information on C/A 124. NVDIMM controller 140 will provide the read data command and address information to DRAM device 134 and set multiplexor 132 to permit data transfers between memory controller 120 and the DRAM device, and the DRAM device will provide the read data from the addressed memory location to memory controller 120 on DQ 122. In another example, a memory write to a memory location associated with DRAM device 134 will start with memory controller 120 presenting write data command and address information on C/A 124 and presenting the write data on DQ 122. NVDIMM controller 140 will provide the write data command and address information to DRAM device 134 and set multiplexor 132 to permit data transfers between memory controller 120 and the DRAM device, and the DRAM device will write the data to the addressed memory location.

Information handling system 100 operates to provide for a save data operation to be performed for the data stored on NVDIMM 130. Here, an event, such as a loss of system power, can trigger the runtime save data operation. The runtime save data operation can include steps by processing complex 110, such as the flushing of all processor caches to NVDIMM 130. In a particular embodiment, after processing complex 110 is finished with memory transactions, memory controller 120 initiates an Asynchronous DRAM Refresh (ADR) mode on NVDIMM 130 by asserting a save data signal on save data signal output 128. NVDIMM 130 then proceeds to save data the date from DRAM device 134 to non-volatile memory device 136. In the ADR mode, multiplexor 132 is set to connect DRAM device 134 to NVDIMM controller 140. In this way, DRAM device 134 is isolated from memory controller 120. NVDIMM controller 140 then reads the data from DRAM device 134, and stores the data to non-volatile memory device 136. In the ADR mode, NVDIMM 130 receives power from NVDIMM power source 150 to perform the data reads from DRAM device 134, and to store the data to non-volatile memory device 136. In a particular embodiment, NVDIMM power source 150 represents a battery device that is dedicated to NVDIMM 130 and any other NVDIMM devices of information handling system 100, as needed or desired, in order to conduct the runtime save data operation on the information handling system. In another embodiment, NVDIMM power source 150 represents one or more super-capacitors that are configured to provide power to NVDIMM 130 and any other NVDIMM devices of information handling system 100, as needed or desired, in order to conduct the runtime save data operation on the information handling system.

In particular, information handling system 100 operates to monitor data usage on NVDIMM 130 to determine if one or more rows of data has been modified since a previous save data operation on the information handling system has occurred. Then, when a next save data operation is initiated, NVDIMM 130 operates to read only the rows with modified data and to store the data to the non-volatile memory device. Here, rows with unmodified data will already be stored to the non-volatile memory device, and so it is not necessary to read and to store the unmodified data to the non-volatile memory device. In this way, the power demand on NVDIMM power source 150 can be reduced because during each save data operation, some smaller portion of the data stored on NVDIMM 130 is stored to the non-volatile memory device.

In a particular embodiment, tracking and management of the status of the data stored on NVDIMM 130 is managed by processing complex 110. Here, file access table 112 operates to store reference information for the memory locations of DRAM device 134 that have been modified since a previous system reboot. As such, file access table 112 is configured to monitor memory traffic between processing complex 110 and NVDIMM 130, such as by tracking the addresses associated with data write operations to the NVDIMM, or by tracking activities at a higher platform level, such as in a platform BIOS or UEFE, or in a program level. In any case, when data is written to a memory location of DRAM device 134, file access table 112 operates to update a flag associated with the memory location to indicate that the memory location includes modified data.

Then, in order for NVDIMM controller 140 to perform a save data operation on the modified memory locations in DRAM device 134, the modified location information from file access table 112 must be provided to the NVDIMM controller. In a first case, processing complex 110 operates to reserve a portion of the memory locations of DRAM device 134 for storing a copy file access table 135 of file access table 112. Here, during normal operations, processing complex 110 directs memory controller 120 to issue memory write transactions to NVDIMM 130. The memory write transactions include the information from file access table 112 and are stored to the memory locations associated with file access table 135. Then, when a next save data operation is initiated, NVDIMM controller 140 operates to isolate DRAM device 134 from memory controller 120 and to read file access table 135 from the DRAM device to determine which memory locations of the DRAM device have been modified. NVDIMM controller 140 then reads the data from only the modified rows of DRAM device 134, and stores the modified data to non-volatile memory device 136. In another case where NVDIMM controller 130 operates to receive runtime save data commands, the NVDIMM controller also includes a data storage area sufficient to store a copy of file access table 112. Here, when memory controller 120 issues a runtime save data command to NVDIMM controller 140, the memory controller also provides the information from file access table 112, which the NVDIMM controller stores in the data storage area. Then, when a next save data operation is initiated, NVDIMM controller 140 operates to isolate DRAM device 134 from memory controller 120 and to determine which memory locations of the DRAM device have been modified based upon the information in the copy of the file access table. NVDIMM controller 140 then reads the data from only the modified rows of DRAM device 134, and stores the modified data to non-volatile memory device 136.

In another embodiment, tracking and management of the status of the data stored on NVDIMM 130 is managed by NVDIMM controller 140. Here, NVDIMM controller 140 includes an address tag buffer 148, and the NVDIMM controller operates to determine the memory addresses associated with data read commands from memory controller 120, and to mark those memory addresses as modified in the address tag buffer. Then, when a next save data operation is initiated, NVDIMM controller 140 operates to isolate DRAM device 134 from memory controller 120 and to determine which memory locations of the DRAM device have been modified based upon the information in address tag buffer 148. NVDIMM controller 140 then reads the data from only the modified rows of DRAM device 134, and stores the modified data to non-volatile memory device 136.

In all of the above embodiments, when a restore data operation is completed, the information indicating that a particular memory location has been modified needs to be cleared, because all data stored on DRAM device 134 will be unmodified since the completion of the restore data operation. Thus, where one or more of file access tables 112, 135, or a copy in NVDIMM controller 140 are instantiated on information handling system 100, the respective file access tables are cleared after a restore data operation. Similarly, where NVDIMM controller 140 includes address tag buffer 148, the address tag buffer is cleared after a restore data operation.

Figure 2:
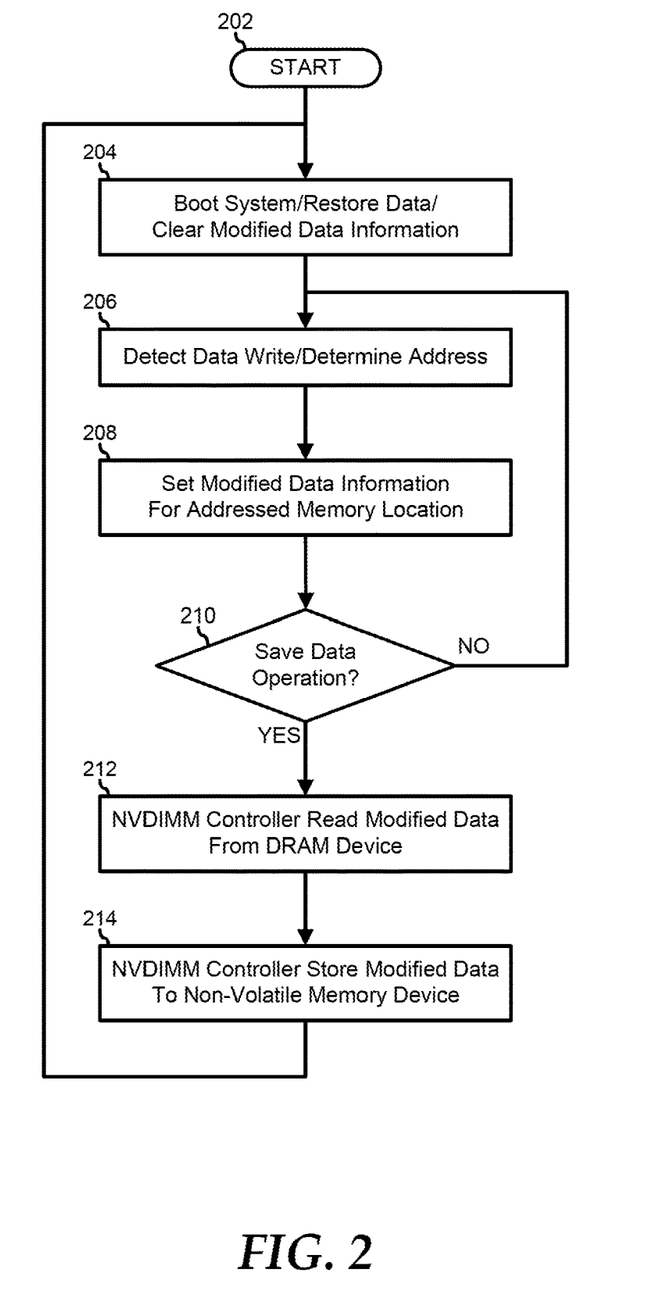
FIG. 2 is a flowchart illustrating a method for storing modified data to a non-volatile memory device on an NVDIMM during a save data operation according to an embodiment of the present disclosure.

FIG. 2 illustrates a method for storing modified data to a non-volatile memory device on an NVDIMM during a save data operation, starting at block 202. An information handling system is booted in block 204. During the boot process, NVDIMMs of the information handling system perform a restore data operation to restore data from their non-volatile memory devices to their DRAM devices, and modified data information stored on the information handling system during the previous cycle is cleared. For example, a system BIOS or UEFI can direct NVDIMM 130 to restore data from non-volatile memory device 136 to DRAM device 134, and one or more of file access tables 112 and 135, a file access table in NVDIMM controller 140, address tag buffer 148, or metadata stored for each row in the DRAM device can be cleared to indicate that all data stored on the DRAM device is unmodified after the data restore data operation.

The information handling system detects data writes to the NVDIMMs, and determines the associated memory addresses in block 206, and the modified data information for the memory addresses is set to indicate that the memory addresses have been modified in block 208. In a first example, file access table 112 can detect memory writes to NVDIMM 130, determine the associated memory addresses, and store the memory addresses. Here, in a method step, not shown, file access table 112 transfers the modified data information to file access table 135 or to a file access table in NVDIMM controller 140, and maintains the copies as needed. In another example, NVDIMM controller 140 can detect memory writes to NVDIMM 130, determine the associated memory addresses, and store the modified data information in address tag buffer 148. In a third example, each row of DRAM device 134 can include metadata that is modified to indicate that the row includes modified data when the row is written to.

A decision is made as to whether or not a save data operation has been initiated in decision block 210. If not, the "NO" branch of decision block 210 is taken and the method returns to block 206 where the information handling system detects data writes to the NVDIMMs and determines the associated memory addresses. If a save data operation has been initiated, the "YES" branch of decision block 210 is taken, the NVDIMM controllers read the modified data from their DRAM devices in block 212 and stores the modified data to their non-volatile memory devices in block 214. Thus, in the first example above, NVDIMM controller 140 can determine which rows are modified from one or more of file access table 135 and a file access table of the NVDIMM controller. In the second example above, NVDIMM controller 140 can determine which rows are modified from address tag buffer 148. In the third example above, NVDIMM controller 140 can read each row from DRAM device 134 and detect from the metadata associated with the rows, as to whether or not the row has been modified. After storing the modified data to the non-volatile memory devices in block 214, the method returns to block 204, where the information handling system is booted.

Figure 3:
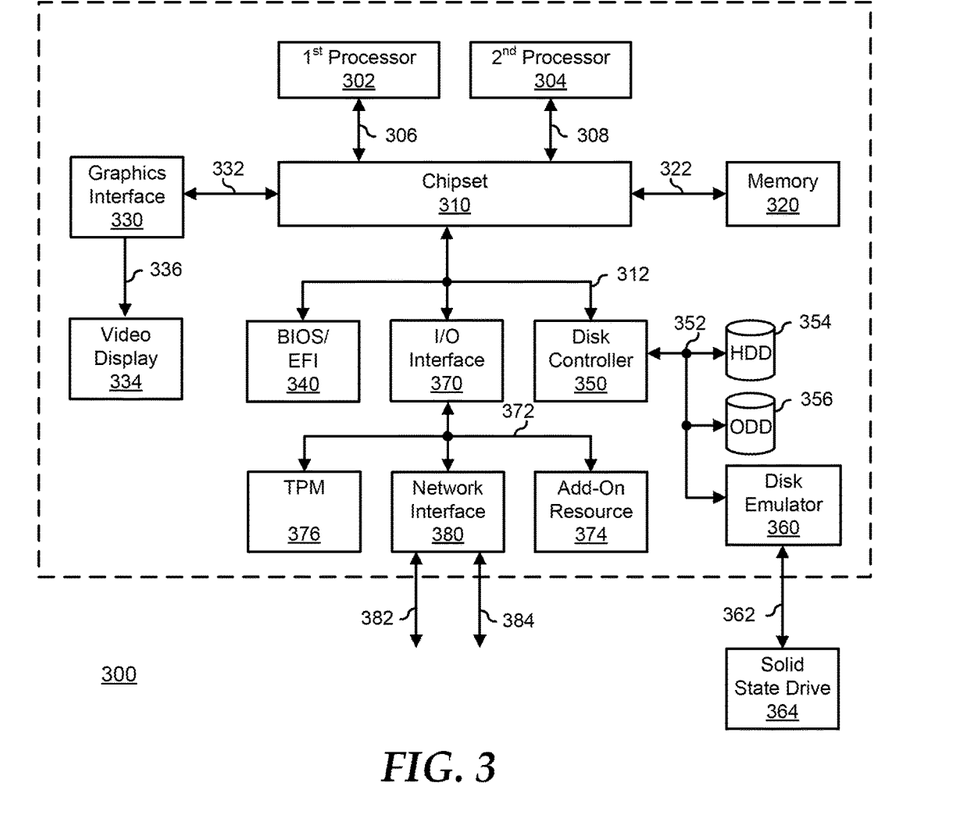
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a Dual In-Line Memory Module (DIMM) coupled to a memory controller via a memory interface, the DIMM including:
      a Dynamic Random Access Memory (DRAM) device; and
      a non-volatile memory device; and
   the memory controller configured to:
      determine that a first memory location of the DRAM device includes first data that is modified data; and
      send first information to the DIMM, the first information to indicate that the first memory location includes the first data;
   wherein the DIMM is configured to:
      receive the first information from the memory controller;
      store the first information on the DRAM device;
      receive an indication to perform a save data operation; and
      in response to receiving the indication, transfer the first information from the DRAM device to the non-volatile memory device; and
      in further response to receiving the indication, transfer the first data to the non-volatile memory device, but not transfer second data that is unmodified data based upon the first information.

2. The information handling system of claim 1, wherein the DIMM is further configured to:
   receive second information from the memory controller, the second information to indicate a second memory location of the DRAM device that includes the second data; and
   store the second information on the DRAM device.

3. The information handling system of claim 1, wherein the first data includes a first modified data indicator that is set, and the second data includes a second modified data indicator that is cleared.

4. The information handling system of claim 3, wherein the memory controller determines:
   that the first data is modified data based upon the first modified data indicator being set; and
   that the second data is unmodified data based upon the second modified data indicator being cleared.

5. The DIMM information handling system of claim 1, wherein the DRAM device has a first capacity and the non-volatile memory device has a second storage capacity, the second storage capacity being greater than the first storage capacity.

6. The DIMM information handling system of claim 5, wherein the DIMM comprises a N-type non-volatile DIMM (NVDIMM-N).

7. The information handling system of claim 1, wherein the DIMM comprises a fifth generation Double Data Rate (DDR5) DIMM.

8. A method, comprising:
   determining, by a memory controller of an information handling system coupled to a Dual In-Line Memory Module (DIMM) of the information handling system via a memory interface, that a first memory location of a Dynamic Random Access Memory (DRAM) device of the DIMM includes first data that is modified data;
   sending, by the memory controller, first information to indicate that the first memory location includes the first data to the DIMM via the memory interface;
   receiving, by the DIMM, the first information;
   storing, by the DIMM, the first information on the DRAM device;
   receiving, by the DIMM, an indication to perform a save data operation;
   in response to receiving the indication, transferring the first information from the DRAM device to a controller of the DIMM; and
   performing, by the MAI, the save data operation to transfer the first data from the DRAM device to a non-volatile memory device of the DIMM, wherein the save data operation includes transferring first data and not transferring the second data that is unmodified data based upon the first information.

9. The method of claim 8, further comprising:
   receiving, by the DIMM, second information from the memory controller via the memory interface, the second information to indicate a second memory location of the DRAM device that includes the second data; and
   storing the second information on the DRAM device.

10. The method of claim 8, wherein the first data includes a first modified data indicator that is set, and the second data includes a second modified data indicator that is cleared.

11. The method of claim 10, further comprising:
   determining that the first data is modified data based upon the first modified data indicator being set; and
   determining that the second data is unmodified data based upon the second modified data indicator being cleared.

12. The DIMM of claim 8, wherein the DRAM device has a first capacity and the non-volatile memory device has a second storage capacity, the second storage capacity being greater than the first storage capacity.

13. The DIMM of claim 12, wherein the DIMM comprises a N-type non-volatile DIMM (NVDIMM-N).

14. The DIMM of claim 8, wherein the DIMM comprises a fifth generation Double Data Rate (DDR5) DIMM.

* * * * *

UNITED STATES PATENT AND TRADEMARK OFFICE
CERTIFICATE OF CORRECTION

PATENT NO. : 10,289,339 B2
APPLICATION NO. : 15/445179
DATED : May 14, 2019
INVENTOR(S) : Vadhiraj Sankaranarayanan et al.

Page 1 of 1

It is certified that error appears in the above-identified patent and that said Letters Patent is hereby corrected as shown below:

In the Claims

Column 10, Line 57: Please change "The DIMM information" to --The information--

Column 10, Line 62: Please change "The DIMM information" to --The information--

Column 11, Line 19: Please change "performing, by the MAI" to --performing, by the DIMM--

Signed and Sealed this
Tenth Day of March, 2020

Andrei Iancu
*Director of the United States Patent and Trademark Office*